UNITED STATES PATENT OFFICE 2,588,602

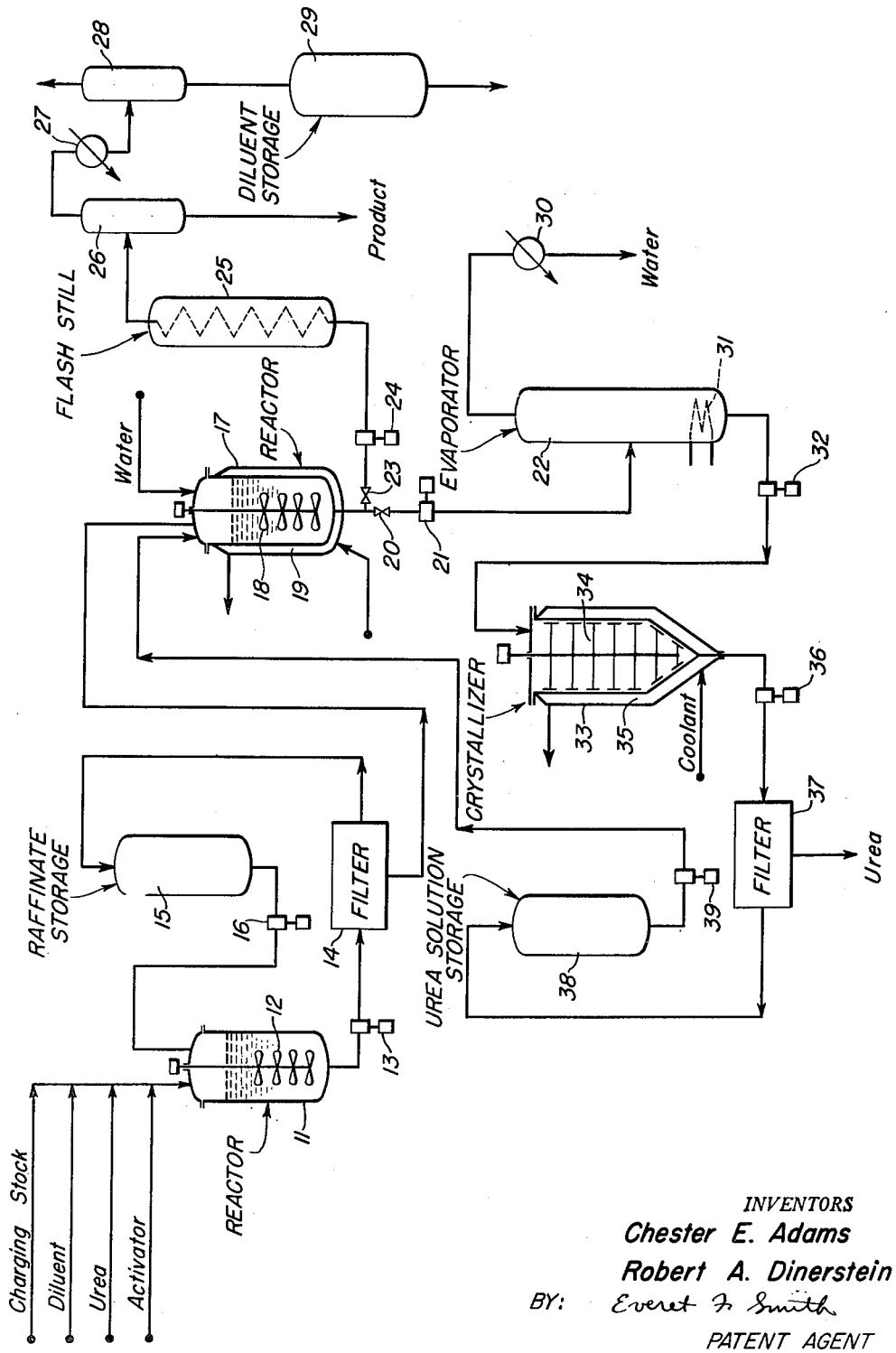

FRACTIONATION OF ORGANIC COMPOUNDS BY ADDUCT FORMATION

Chester E. Adams, Highland, Ind., and Robert A. Dinerstein, Chicago, Ill., assignors to Standard Oil Company, Chicago, Ill., a corporation of Indiana Application December 27, 1947, Serial No. 794,140

9 Claims. (Cl. 260—676)

Our invention relates to the fractionation of organic compounds. More particularly, it relates to separating from a mixture of organic compounds successive fractions of straight-chain constituents thereof having progressively lower molecular weights.

It is known that urea forms solid molecular complexes with numerous classes of straight-chain organic compounds, most of which contain six or more carbon atoms in the molecule, and that by use of this technique such straight-chain organic compounds may be removed from mixtures with branched-chain and/or cyclic compounds. We have now found that when a mixture of such compounds is contacted with a quantity of urea insufficient to react with all of the urea-reactive compounds contained in the reaction mixture, the urea reacts preferentially with the compounds of highest molecular weight. On the basis of this discovery, we have developed a novel and highly useful technique for the fractionation of urea-reactive straight-chain organic compounds, which comprises the incremental addition of urea to mixtures containing such compounds to effect fractional adduct formation. In operating according to this principle, we contact the mixture of straight-chain organic compounds, optionally containing branched-chain and/or cyclic compounds, with a urea activator, as hereinafter defined, and a quantity of urea sufficient to react only with the straight-chain compound of highest molecular weight, or the compounds of highest molecular-weight range. Crystalline urea adducts of the higher-molecular-weight components are formed thereby, and are removed by suitable means. Thereafter, the raffinate may be recycled if desired for further urea treatment to remove all of the urea-reactive compounds remaining therein, or to fractionally remove the higher-molecular-weight constituents thereof. In this manner, not only may straight-chain organic compounds be removed from branched-chain and/or cyclic compounds, as reported in the prior art, but a fractionation of the straight-chain compounds is achieved as well.

One object of our invention is to effect a fractionation according to molecular weight among straight-chain organic compounds. Another object of our invention is to separate from mixtures containing straight-chain organic compounds which form solid urea adducts, successive fractions of straight-chain constituents thereof having progressively lower molecular weights. A further object of our invention is to effect a separation of petrolatum, waxes, and the like, into fractions of more homogeneous composition and better-defined properties. A still further object of our invention is to isolate substantially pure straight-chain organic compounds from mixtures thereof with branched-chain and/or cyclic compounds. A further important object of our invention is to isolate special fractions of straight-chain organic compounds having unique and highly useful properties. Other objects of our invention and its advantages over the prior art will be apparent from the following description and examples.

Our process is suitable in general for the fractionation of straight-chain organic compounds which form solid adducts with urea. Suitable groups of compounds include saturated aliphatic hydrocarbons, olefins, alcohols, aldehydes, ketones, ethers, thioethers, mercaptans, alkyl disulfides, primary alkyl halides, monoalkylamines, alkanoic acids, and alkanoic acid esters. For most effective separation, the urea-reactive constituents of our charging stock should consist substantially completely of members of a single group, such as one of the foregoing groups, with respect to the presence of functional substituents therein.

In carrying out the process of our invention, we contact urea and a urea activator with a suitable charging stock in the proportion of approximately $(n-2)$ moles of urea per mole of the highest-molecular-weight urea-reactive straight-chain organic compound in the charging stock, where $n$ is the number of carbon atoms in said compound, or in the proportion of approximately $(n-2)$ moles of urea per mole of the higher-molecular-weight fraction that it is desired to separate, where $n$ is the average number of carbon atoms per molecule in said fraction. For example, if it is desired to remove 50 mole-percent of the straight-chain organic compounds contained in the charging stock, then the charging stock should be contacted with approximately $m(n-2)/2$ moles of urea, where $m$ is the total number of moles of such compounds contained therein.

Suitable urea activators may be chosen from the class including water and various oxygenated organic compounds, such as alcohols, aldehydes, ketones, and the like. Among the organic activators, we have found aliphatic monohydric alcohols, aliphatic aldehydes, and aliphatic ketones to be most effective, and our preferred activators are water, methanol, acetone, ethanol, n-propyl alcohol, and isopropyl alcohol. However, we have successfully employed numerous other oxygenated organic compounds as urea activators, including 1-octanol, 2-ethyl-1-hexanol, n-dodecyl alcohol, methyl n-amyl ketone, amyl acetate, ethyl ether, and others, and it is to be understood that our invention is not limited to the use of any particular materials or groups of materials as activators for the urea employed therein. Where the oxygenated organic activators are straight-chain compounds, they should preferably, but not necessarily, be chosen from the group containing less than six carbon atoms in the molecule, since the latter group are more effective, and do not tend to undergo competitive reactions with urea.

The urea may be used in the form of a saturated solution in the activator, or as a slurry of solid urea in such a saturated solution, or in conjunction with a relatively small proportion of activator. Preferably, we use activator and urea in a molar ratio between about 0.05:1 and 1:1, as taught in the copending joint application of Robert A. Dinerstein and Wilford J. Zimmerschied, Serial No. 794,199, filed December 27, 1947, now abandoned. When used in the solid state, the urea should preferably be in finely divided condition, optimally ranging in particle size from around 1 to 50 microns.

The charging stock may first be dissolved in a suitable diluent, preferably an organic liquid which has little or no solvency for or reactivity with urea, which does not hinder the formation of crystalline urea adducts of the straight-chain constituents of the charging stock, and which does not boil in the same range as the desired purified products. We prefer to use a relatively low-boiling hydrocarbon liquid, such as benzene, toluene, xylene, cyclohexane, methylcyclohexane, and the like; or petroleum naphthas containing little or no straight-chain hydrocarbon compounds higher than $C_5$.

The reaction between urea and urea-reactive organic compounds takes place best at temperatures between about 20 and 75° C., but may be carried out at substantially lower and higher temperatures, suitably between around 0 and 90° C., as long as a liquid phase and a solid phase are maintained within the reaction vessel. The reactants may be mixed at an elevated temperature (for example, around 100° C. or above) and cooled to the desired reaction temperature. In an advantageous embodiment of our invention, the reactants may be mixed at a temperature above the melting point of urea, and then cooled while being vigorously agitated. Excellent contact is thereby assured, and the urea adduct is formed as the temperature of the mixture falls below the level at which a solid phase forms.

The reaction time in our process is not critical. The reaction mixture is preferably agitated for a period of at least about 0.1 hour, and the reaction is complete in most cases in from one-half to one hour. Substantially shorter reaction times may be used, for example, one minute or less, since we have observed that the initial stages of adduct formation take place very rapidly; and substantially longer reaction times may of course be used if desired, especially when processing long-chain materials, which tend to react somewhat more slowly.

Elevated pressures may be maintained within the reaction vessel, if desired, particularly if the reaction mixture contains volatile constituents.

The reaction of urea with the higher molecular-weight straight-chain organic compounds of the charging stock produces a voluminous precipitate of crystalline adduct, which is then separated by filtration, settling, centrifugation, or other suitable means. The adduct so obtained may optionally be washed with additional solvent of the type suitable for diluting the charging stock, as set forth above, in order to remove any occluded liquids. The adduct is then decomposed by addition of an excess of urea solvent, such as water or methanol or the like, or by heating to an elevated temperature, above the melting point of any normally solid constituent of the urea adduct, and preferably around or above the melting point of urea. The adduct is decomposed thereby, and the straight-chain organic constituent or constituents are liberated as a second layer, which is separated and further purified as desired.

The raffinate may be subjected to further processing steps according to the same procedure, in order to remove any additional straight-chain constituents remaining therein.

Our process is especially well adapted to the separation and purification of waxes. In conventional refinery practice, paraffin wax is obtained from paraffin distillate by chilling the paraffin distillate and filter-pressing to remove the wax from the oil. The resulting wax is heavily contaminated with oil, which cannot be removed by convenient means such as fractional distillation owing to the fact that such waxes are a complex mixture of straight-chain, naphthenic, and aromatic hydrocarbons. Instead, the waxes must be subjected to repeated "sweating," a cumbersome and expensive operation, in order to obtain a product of satisfactory properties. The necessity for such purification steps is eliminated when waxes are separated from paraffin distillate according to our invention. By suitable adjustment of operating conditions, we are able to obtain substantially pure materials as the primary products of our process; and since the products are composed virtually completely of straight-chain materials, they may thereafter be further purified by fractional distillation, if desired, since the melting points of the various fractions will be related directly to the boiling points, in striking contrast to the behavior of the materials prepared in the prior-art processes. By means of our invention, we have succeeded in separating hard, clean wax fractions, of higher melting point, from soft waxes, leaving a tacky, somewhat oily residue of lower melting point.

The attached flow sheet illustrates one embodiment and one application of our process:

Into reactor 11 are introduced a suitable charging stock such as a paraffin distillate, an equal volume of a diluent such as isooctane, a quantity of urea equal to $m(n-2)$ moles, where $m$ is the total number of moles of straight-chain constituents of the paraffin distillate having 26 or more carbon atoms in the molecule, and $n$ is the average number of carbon atoms per molecule of such constituents, and a quantity of urea activator, suitably water or methanol, such that the molar ratio of activator to urea is between about 0.1:1 and 0.6:1. The mixture within reactor 11 is thoroughly mixed for approximately one hour at a temperature around 30° C. by agitator 12, during which time a voluminous crystalline adduct is formed from the urea and the waxy straight-chain constituents of the paraffin distillate containing 26 carbon atoms and above. The resulting slurry is transferred by pump 13 into filter 14, from which the raffinate flows into storage tank 15. The raffinate may subsequently be returned by pump 16 to reactor 11 and treated with an additional quantity of urea to separate a wax fraction of lower molecular weight.

The filter cake from filter 14 may optionally be reslurried with isooctane, suitably in reactor 11, and refiltered in order to remove occluded liquids therefrom. The filter cake, with or without such additional purification, is charged into reactor 17, equipped with agitator 18 and jacket 19, through which a heat-exchange liquid is passed. In reactor 17, the filter cake is mixed with a sufficient quantity of water to dissolve all of the urea, and the mixture is agitated and heated to a temperature above the melting point of the wax constituents of the adduct. After the decomposition of the adduct is complete, the agitator is stopped and the mixture is allowed to stratify. The aqueous urea solution is then drawn off through valve 20 and transferred by pump 21 into evaporator 22. Thereafter, the wax phase is withdrawn from reactor 17 through valve 23 and fed by pump 24 into flash still 25, which the isooctane and any dissolved organic-type urea activator are vaporized. Liquid wax and vapors of isooctane and activator emerge from flash still 25 into separator 26, from which the wax is drawn off and sent to further purification, suitably by clay treatment, fractional distillation, or the like. The isooctane and activator vapors emerging from separator 26 are condensed in cooler 27, and the condensate flows into separator 28, from which it is withdrawn to storage tank 29 and is ultimately recycled. The distillation system is preferably operated under vacuum, suitably between around 10 and 50 mm. Hg, the vacuum source being connected to the system at the top of separator 28.

The aqueous urea solution from reactor 17 is concentrated in evaporator 22 to the point of incipient crystallization, the water passing off through cooler 30, together with any urea activator dissolved in the aqueous phase. The evaporator is heated by steam scroll 31, and may be operated under vacuum, if necessary, in order to produce the desired urea concentration without the use of high temperatures. The concentrated solution is transferred from the bottom of evaporator 22 by pump 32 into crystallizer 33, equipped with scraper 34 and jacket 35, through which cold water is passed. A substantial proportion of the urea crystallizes out when the solution is cooled, and the resulting slurry is transferred by pump 36 into filter 37. The filtrate flows into storage tank 38, from which it is recycled by pump 39 to reactor 17 for use in decomposing further batches of adduct. The urea filter cake from filter 37, after being blown as dry as possible, is recycled to reactor 11.

While the flow sheet illustrates an embodiment of our process utilizing batch equipment and techniques, it is to be understood that continuous operation of the process is contemplated, utilizing suitable means for continuously commingling the reactants, withdrawing a stream thereof, continuously separating adduct from raffinate, and regenerating the urea and the desired product.

Our invention will be more fully understood from the following specific examples:

*Example I*

A motor-oil wax melting at 140° F. was treated with a large excess of urea according to the following procedure, and substantially all straight-chain constituents were thereby removed:

A solution of 90 grams of the motor-oil wax in 900 ml. of isooctane was agitated with 300 grams of urea and 300 ml. of methanol for three hours at 110° F. The resulting adduct was separated by filtration and was then washed twice with 800 ml. of warm isooctane. On being decomposed with an excess of water at a temperature around 150° F., the adduct yielded 85 grams of straight-chain material melting at 143° F. The residual branched-chain and cyclic material melted at 118° F., and failed to react on further treatment with urea.

Another portion of the above motor-oil wax melting at 140° F. was subjected to fractionation by three successive urea treatments according to our new process:

In the first treatment, a solution of 90 grams of wax in 600 ml. of isooctane was agitated with 120 grams of urea and 80 ml. of ethanol for three hours at 110° F. The resulting adduct was separated from the raffinate by filtration and washed twice with 500 ml. of warm isooctane. The adduct was then decomposed with an excess of water at 160° F., and the liberated wax fraction was separated. The raffinate was stripped free of isooctane, yielding a raffinate wax fraction.

In the second treatment, 46 grams of the raffinate wax fraction from the first treatment was dissolved in 600 ml. of isooctane, and the solution was agitated with 60 grams of urea and 40 ml. of methanol for three hours at 110° F. The resulting adduct was removed, washed, and decomposed as before, and the raffinate was stripped free of isooctane.

In the third treatment, 22 grams of the raffinate wax fraction from the second treatment was dissolved in 300 ml. of isooctane, and the solution was agitated with 30 grams of urea and 20 ml. of methanol for three hours at 110° F. The resulting adduct was separated, washed, and decomposed as before, and the raffinate was stripped free of isooctane.

In each of the three experiments, small portions of the adduct wax fraction and of the raffinate wax fraction were abstracted and subjected to melting-point determination. The results were as follows:

| Treatment No. | Wax from adduct | | | Raffinate | |
|---|---|---|---|---|---|
| | Yield [1] weight-per cent | Melting point, °F. | Ratio, Urea to wax fraction, molar | Yield [1] weight-per cent | Melting point, molar |
| 1 | 38 | 145 | 27 | 56 | 138 |
| 2 | 39 | 141 | 25 | 25 | 135 |
| 3 | 50 | 138 | 20 | 45 | 126 |

[1] Basis: weight of wax material contacted with urea in each step.

*Example II*

A 68-gram sample of refined paraffin wax, melting point 139° F., was dissolved in 600 ml. of isooctane and treated twice with urea. In the first treatment, a mixture of 135 grams of urea and 90 ml. of methanol was agitated with the charging stock for a period of two hours at room temperature, and the resulting adduct was filtered off, washed with isooctane, and decomposed as in Example I. The raffinate was stripped free of isooctane.

In the second treatment, 22 grams of raffinate wax from the first treatment were dissolved in 200 ml. of isooctane, and the resulting solution was agitated with 45 grams of urea and 30 ml. of methanol for two hours at room temperature. The resulting raffinate was filtered off, washed with isooctane, and decomposed as in Example I, and the raffinate was stripped free of isooctane.

In the two treatments, a total of more than 80 percent of the wax reacted. From the adducts, wax fractions were isolated having melting points of 141° F. and 134° F., respectively; and the raffinate wax from the second treatment had a melting point of 123° F.

*Example III*

A $C_{12}$ hydrocarbon fraction was prepared by reacting carbon monoxide and hydrogen over an iron catalyst, separating and hydrogenating the resulting oil layer, and fractionally distilling. The desired fraction contained predominantly $C_{12}$ hydrocarbons, together with minor proportions of n-$C_{11}$ and branched $C_{13}$ hydrocarbons, as was determined by careful analytical fractionation; and the total concentration of straight-chain materials was approximately 41 percent.

The $C_{12}$ fraction described above was treated with urea in two steps. In the first step, 100 ml. of the fraction were agitated at 70 F. for one hours with 170 grams of urea and a sufficient quantity of methanol to dissolve most, but not all, of the urea. The resulting adduct was separated and washed carefully with isooctane. The raffinate from the first urea treatment was subjected to a second treatment under similar conditions with 200 ml. of a saturated solution of urea in methanol, and the adduct was separated as before. The adducts from each of the treatments were decomposed separately by treatment with an excess of water at room temperature, and the organic layers liberated thereby were separated and analyzed. The results were as follows:

|  | Volume | Refractive Index, $n_D^{20}$ |
|---|---|---|
|  | Ml. |  |
| Organic phase from first adduct | 35 | 1.4220 |
| Literature value for n-dodecane |  | 1.4219 |
| Organic phase from second adduct | 3 | 1.4188 |
| Literature value for n-undecane |  | 1.4173 |

*Example IV*

A 425-gram sample of paraffin distillate having a boiling range of about 450 to 750° F., obtained in the fractionation of Mid-Continent crude oil, type A, was diluted with 150 ml. of isooctane, and the resulting solution was agitated with 135 grams of urea and 90 ml. of methanol for two hours at 30° C. The resulting slurry was filtered. The filtrate represented 70% by weight of the charging-stock solution, and a sample of the filtrate, on being stripped free of isooctane, had a pour point of 0° F. An additional 20 percent of the charging stock was recovered by washing the adduct with isooctane. The solvent-free washings had a pour point of −15° F. The urea adduct was treated with an excess of water at 150° F., and a waxy layer weighing 32 grams and representing 8 percent by weight of the charging stock was obtained. This material was fractionally distilled under vacuum, and 40 percent of it was separated as pure straight-chain $C_{15}$-$C_{21}$ hydrocarbons. Subsequently the $C_{22}$-$C_{26}$ constituents were taken off overhead as a series of four small fractions comprising together 44% of the charging stock. The bottoms from the distillation were a wax melting at 137° F. and weighing five grams, equivalent to approximately 16 percent of the charging stock.

A 274-gram portion of the filtrate obtained from the first treatment with urea was contacted again with 87 grams of urea and 58 ml. of methanol for two hours at 80° F. The resulting filtrate, after being stripped free of isooctane, was an oil having a pour point of −15° F.; and the adduct, on being decomposed, yielded four grams of waxy straight-chain hydrocarbons.

*Example V*

A series of experiments was carried out in which a 20 volume percent solution of an equimolar mixture of n-decane and cetane (n-hexadecane) in isooctane was contacted at room temperature with methanol and an insufficient quantity of urea to react with all of the straight-chain constituents in the charging stock. The adduct was separated by filtration, washed with isooctane, and decomposed as described in Example I. The reaction conditions and results were as follows:

| | | | | |
|---|---|---|---|---|
| Ratio, urea to cetane, molar | 10 | 10 | 10 | 24 |
| Ratio, urea to straight-chain hydrocarbons, molar | 5 | 5 | 5 | 12 |
| Ratio, methanol to urea, molar | 0.25 | 0.25 | 1 | 0.25 |
| Contact time, hours | 0.75 | 4 | 0.75 | 0.75 |
| Cetane in hydrocarbons from adduct, mole percent | 90 | 85 | 87 | 73 |
| Cetane in isooctane-free raffinate, mole percent | 26 | 27 | 33 | 20 |
| Cetane in charging stock reacting with urea, percent | 64 | 63 | 57 | 83 |
| n-Decane in charging stock reacting with urea, percent | .6 | 12 | 8 | 28 |

While the foregoing examples represent advantageous embodiments of our invention, we do not wish to be limited to the specific charging stocks, conditions, and operating procedures described therein. Our invention is broadly applicable, as elsewhere detailed in the specification, and it is to be distinctly understood that any modifications or equivalents that would ordinarily occur to those skilled in the art are to be considered as lying within the scope of our invention.

The expression "urea-reactive" used herein refers to the property of forming solid adducts with urea, exhibited by numerous classes of organic compounds, as disclosed herein and in the prior art.

In accordance with the foregoing specification, we claim as our invention:

1. In a process for fractionating a mixture of at least two urea-adduct-forming straight-chain organic compounds having different molecular weights, said compounds being substantially completely of a single class with respect to the presence of functional substituents therein, the steps which comprise contacting said mixture with a urea solvent and a quantity of urea sufficient to react with substantially all of the urea-adduct-forming compound of highest molecular weight in said mixture but insufficient to react with all of said urea-adduct-forming compounds, whereby an adduct is formed containing urea and said highest-molecular-weight urea-adduct-forming compound in purified form, and separating and withdrawing said adduct from the reaction mixture.

2. The process of claim 1 wherein said compounds are hydrocarbons.

3. The process of claim 1 wherein said compounds are alcohols.

4. The process of claim 1 wherein said compounds are aldehydes.

5. The process of claim 1 wherein the molar ratio of urea to said highest-molecular-weight compound is around $(n-2):1$, where $n$ is the number of carbon atoms in the molecule of said highest-molecular-weight compound.

6. In a process for fractionating a mixture of urea-adduct-forming straight-chain organic compounds having different molecular weights and separating a fraction thereof containing the component of highest molecular weight, said compounds being substantially completely of a single class with respect to the presence of functional substituents therein, the steps which comprise contacting said mixture with a urea solvent and a quantity of urea insufficient to react with all of said compounds, but having a molar ratio to the highest-molecular-weight urea-adduct-forming component of said mixture of at least around $(n-2):1$, where $n$ is the number of carbon atoms per molecule in said highest-molecular-weight component, whereby an adduct is formed containing urea and a fraction comprising said highest-molecular-weight component in purified form, and separating and withdrawing said adduct from the reaction mixture.

7. In a process for fractionating a mixture of urea-adduct-forming straight-chain organic compounds having different molecular weights and separating the highest-molecular-weight urea-adduct-forming component thereof, said compounds being substantially completely of a single class with respect to the presence of functional substituents therein, the steps which comprise dissolving said mixture in an organic liquid having substantially no reactivity with or solvency for urea, contacting the resulting solution with a urea solvent and a quantity of urea insufficient to react with all of said compounds but having a molar ratio to the highest-molecular-weight urea-adduct-forming component of said mixture of around $(n-2):1$, where $n$ is the number of carbon atoms per molecule in said highest-molecular-weight component, whereby an adduct is formed containing urea and said highest-molecular-weight component of said mixture in purified form and separating and withdrawing said adduct from the reaction mixture.

8. A process for separating a mixture of straight-chain hydrocarbons having different molecular weights and having in excess of 5 carbon atoms in the molecule which comprises dissolving said mixture in an organic liquid having substantially no reactivity with or solvency for urea, contacting the resulting solution at a temperature between about 20 and 75° C. for a period in excess of around 0.1 hour with a quantity of urea insufficient to react with all of said hydrocarbons but having a molar ratio to the highest-molecular-weight straight-chain hydrocarbon in said mixture of at least, around $(n-2):1$, where $n$ is the number of carbon atoms in the molecule of said highest-molecular-weight straight-chain hydrocarbon, and a quantity of water having a molar ratio to said quantity of urea between about 0.1:1 and 0.6:1; separating an adduct containing urea and said highest-molecular-weight straight-chain hydrocarbon; decomposing said adduct by treatment with water at a temperature above the melting point of said highest-molecular-weight straight-chain hydrocarbon, whereby said hydrocarbon is liberated; and separating and withdrawing said hydrocarbon in purified form.

9. In a process for separating a mixture of urea-adduct-forming straight-chain organic compounds into a series of fractions of successively diminishing molecular weights, said compounds being substantially completely of a single class with respect to the presence of functional substituents therein, the steps which comprise contacting said mixture with a urea activator and successive portions of urea insufficient to react with all of said urea-adduct-forming compounds existing in said mixture at each of such contacting steps, whereby successive adducts are formed containing urea and the highest-molecular-weight urea-adduct-forming compound existing in said mixture at each of such contacting steps, and separately withdrawing said adducts from the reaction mixtures.

CHESTER E. ADAMS.
ROBERT A. DINERSTEIN.

REFERENCES CITED

The following references are of record in the file of this patent:

UNITED STATES PATENTS

| Number | Name | Date |
| --- | --- | --- |
| 1,830,859 | Schotte et al. | Nov. 10, 1931 |
| 2,300,134 | Priewe | Oct. 27, 1942 |
| 2,520,715 | Fetterly | Aug. 29, 1950 |
| 2,520,716 | Fetterly | Aug. 29, 1950 |

OTHER REFERENCES

Technical Oil Mission Reel 143, May 22, 1946, pages 2 to 6.

Kremann: "Chem. Abstracts," vol. 2, page 815 (1907).

Baker et al.: "Sidgwick's Organic Chemistry of Nitrogen," 1942, page 280, Oxford University Press.

Walton et al.: J. A. C. S., vol 47, pages 320–323 (1925).